United States Patent [19]

Crawford

[11] Patent Number: 4,885,688

[45] Date of Patent: Dec. 5, 1989

[54] MINIMIZATION OF DIRECTED POINTS GENERATED IN THREE-DIMENSIONAL DIVIDING CUBES METHOD

[75] Inventor: Carl R. Crawford, Milwaukee, Wis.

[73] Assignee: General Electric Company, Milwaukee, Wis.

[21] Appl. No.: 125,510

[22] Filed: Nov. 25, 1987

[51] Int. Cl.$^4$ .................. G06F 15/62; G06F 15/68; G09G 1/16

[52] U.S. Cl. ................. 364/413.22; 340/728; 364/521; 364/522

[58] Field of Search ............ 364/413.13, 413.14, 364/413.19, 521, 522, 413.22; 382/6, 27; 340/747, 728

[56] References Cited

U.S. PATENT DOCUMENTS

| | | | |
|---|---|---|---|
| 4,402,012 | 8/1983 | Knight | 364/723 X |
| 4,710,876 | 12/1987 | Cline et al. | 364/413.22 |
| 4,719,585 | 1/1988 | Cline et al. | 364/521 |
| 4,739,481 | 4/1988 | Yoshitome | 364/413.19 |
| 4,751,643 | 6/1988 | Lorensen et al. | 382/6 |

*Primary Examiner*—Clark A. Jablon
*Attorney, Agent, or Firm*—James O. Skarsten; Douglas E. Stoner

[57] ABSTRACT

A system for displaying three-dimensional surface structures according to computer graphics methods extracts a surface definition from a tomographic array of data using interpolation of the data for smooth, high resolution images. Interpolation can be performed to a degree where artifact-free images are produced for all viewing orientations. Data-processing capacity and time requirements can be reduced with less interpolation while image quality is maintained for all viewing orientations by inspecting the viewing orientation and appropriately scaling the image.

10 Claims, 6 Drawing Sheets

MINIMIZATION OF DIRECTED POINTS GENERATED IN THREE-DIMENSIONAL DIVIDING CUBES METHOD

The present application is related to U.S. Ser. No. 07/125,662 and to U.S. Ser. No. 07/125,426, filed of even date.

BACKGROUND OF THE INVENTION

The present invention relates in general to three-dimensional (3-D) display of tomographic data, and more specifically to producing artifact-free images using the dividing cubes method for extracting surface definitions from tomographic data.

Tomographic medical imaging employs the collection of data representing cross sections of a body. A plurality of object interrogations can be processed mathematically to produce representations of contiguous cross-sectional images. Such cross-sectional images are of great value to the medical diagnostician in a non-invasive investigation of internal body structure. The technique employed to collect the data is a matter of indifference to the present invention. Any technique such as, for example, X-ray computed tomography, nuclear magnetic resonance tomography, single-photon emission tomography, positron emission tomography, or ultrasound tomography may serve equally.

A body to be imaged exists in three dimensions. Tomographic devices process data for presentation as a series of contiguous cross-sectional slices along selectable axes through the body. Each cross-sectional slice is made up of a number of rows and columns of voxels (parallelepiped volumes with certain faces corresponding to pixel spacing within each slice and others corresponding to slice spacing), each represented by a digitally stored number related to a computed signal intensity in the voxel. In practice, an array of, for example, 64 slices may each contain 512 by 512 voxels. In normal use, a diagnostician reviews images of a number of individual slices to derive the desired information. In cases where information about a surface within the body is desired, the diagnostician relies on interferences of the 3-D nature of the object derived from interrogating the cross-sectional slices. At times, it is difficult or impossible to attain the required inference from reviewing contiguous slices. In such cases, a synthesized 3-D image would be valuable.

Synthesizing a 3-D image from tomographic data is a two-step process. In the first step, a mathematical description of the desired object is extracted from the tomographic data. In the second step, the image is synthesized from the mathematical description.

Dealing with the second step first, assuming that a surface description can be synthesized from knowledge of the slices, the key is to go from the surface to the 3-D image. The mathematical description of the object is made up of the union of a large number of surface elements (SURFELS). The SURFELS are operated on by conventional computer graphics software, having its genesis in computer-aided design and computer-aided manufacturing, to apply surface shading to objects to aid in image interpretation through a synthesized two-dimensional image. The computer graphics software projects the SURFELS onto a rasterized image and determines which pixels of the rasterized image are turned on, and with what intensity or color. Generally, the shading is lightest (i.e., most intense) for image elements having surface normals along an operator-selected line of sight and successively darker for those elements inclined to the line of sight. Image elements having surface normals inclined more than 90 degrees from the selected line of sight are hidden in a 3-D object and are suppressed from the display. Foreground objects on the line of sight hide background objects. The shading gives a realistic illusion of three dimensions.

Returning now to the problem of extracting a mathematical description of the desired surface from the tomographic slice data, this step is broken down into two subtasks, namely the extraction of the object from the tomographic data, and the fitting of the surface to the extracted object. A number of ways are available to do the first subtask. For example, it is possible to search through the signal intensities in the voxels of a slice to discern regions where the material forming the object has sufficient signal contrast with surrounding regions. For example, signal intensities characteristic of bone in X-ray computed tomography have high contrast with surrounding tissue. A threshold may then be applied to the voxels to identify each one in the complete array lying in the desired object from all voxels not in the object.

Referring now to the second subtask, one technique for fitting the 3-D surface to the extracted object is known as the dividing cubes method which is disclosed in commonly assigned U.S. patent application Ser. No. 770,164, filed Aug. 28, 1985, U.S. Pat. No. 4,719,585 which is hereby incorporated by reference. By the dividing cubes method, the surface of interest is represented by the union of a large number of directed points. The directed points are obtained by considering in turn each set of eight cubically adjacent voxels in the data base of contiguous slices. Gradient values are calculated for the cube vertices using difference equations. If the surface passes through a cube, then it is subdivided to form a number of smaller cubes, referred to as subcubes or subvoxels. By interpolation of the adjacent point densities and gradient values, densities are calculated for the subcube vertices and a gradient is calculated for the center of the subcube. The densities are tested (e.g., compared to a threshold). If some are greater and some less than the threshold, then the surface passes through the subcube. In that case, the location of the subcube is output with its normalized gradient, as a directed point. It is also possible to define the surface using a range of densities (e.g., an upper and lower threshold). The union of all directed points generated by testing all subcubes provides the surface representation. The directed points are then rendered (i.e., rasterized) for display on a CRT, for example.

Increasing the number of data points by interpolating into subcubes gives smooth, high resolution images. It is apparent from the above-mentioned application that dividing cubes avoids scan conversion by matching subcube faces to the pixel resolution of the display, thus greatly simplifying rendering.

Various tradeoffs become apparent as the degree of interpolation performed (i.e., subcube size) is varied. It should be noted that large cubes are typically subdivided only by positive integer amounts along each axis, though not necessarily the same integer for different axes. As interpolation increases and subcube size decreases along an axis, image quality (e.g., resolution and smoothness) can be increased. However, since the number of data points increases, more storage, processing hardware, and processing time are required. Therefore, the subcubes should be as large as possible without adversely affecting image quality.

In interactive graphics systems, an operator can perform various functions on the image, such as scaling (or zooming) and rotation, thereby defining a viewing perspective. These functions are typically achieved using a Current Transformation Matrix (CTM) that operates on the data in a renderer before being sent to the display.

A further consequence of the amount of data interpolation relates to the appearance of image artifacts at certain rotational positions. Thus, a set of directed points may have sufficient interpolation to view the object from one angle, but not enough for another viewing angle. The image artifact usually encountered is a structured pattern of holes in the image.

Accordingly, it is a principal object of the present invention to provide artifact-free images while minimizing data-handling requirements and the amount of computations.

It is a further object of the invention to minimize the number of directed points generated by the dividing cubes method of extracting a surface definition from 3-D tomographic data.

It is still another object to eliminate holes in an image resulting from insufficient interpolation.

SUMMARY OF THE INVENTION

These and other objects are achieved in the invention in which the size of subcube faces are matched to a size greater than about $1/\sqrt{2}$ of the 3-D pixel size. If the object is viewed along an axis of the tomographic data, then a minimum number of directed points without image artifacts is achieved when the subcubes are matched to 3-D pixel size.

Rather than increase interpolation for viewing angles where artifacts would appear without more directed points, image size can be reduced to a degree where the artifacts are eliminated. Thus, a constant amount of interpolation may be used while providing maximum resolution and image quality forr the primary viewing angles. For other angles, an artifact-free image is displayed with some loss of resolution. Those images that are reduced in size by scaling during image rendering can thereafter be magnified back to its original size for continuity of presentation, although the small loss of resolution cannot be recovered.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings in which:

DETAILED DESCRIPTION OF THE INVENTION

Figures 1, 10:
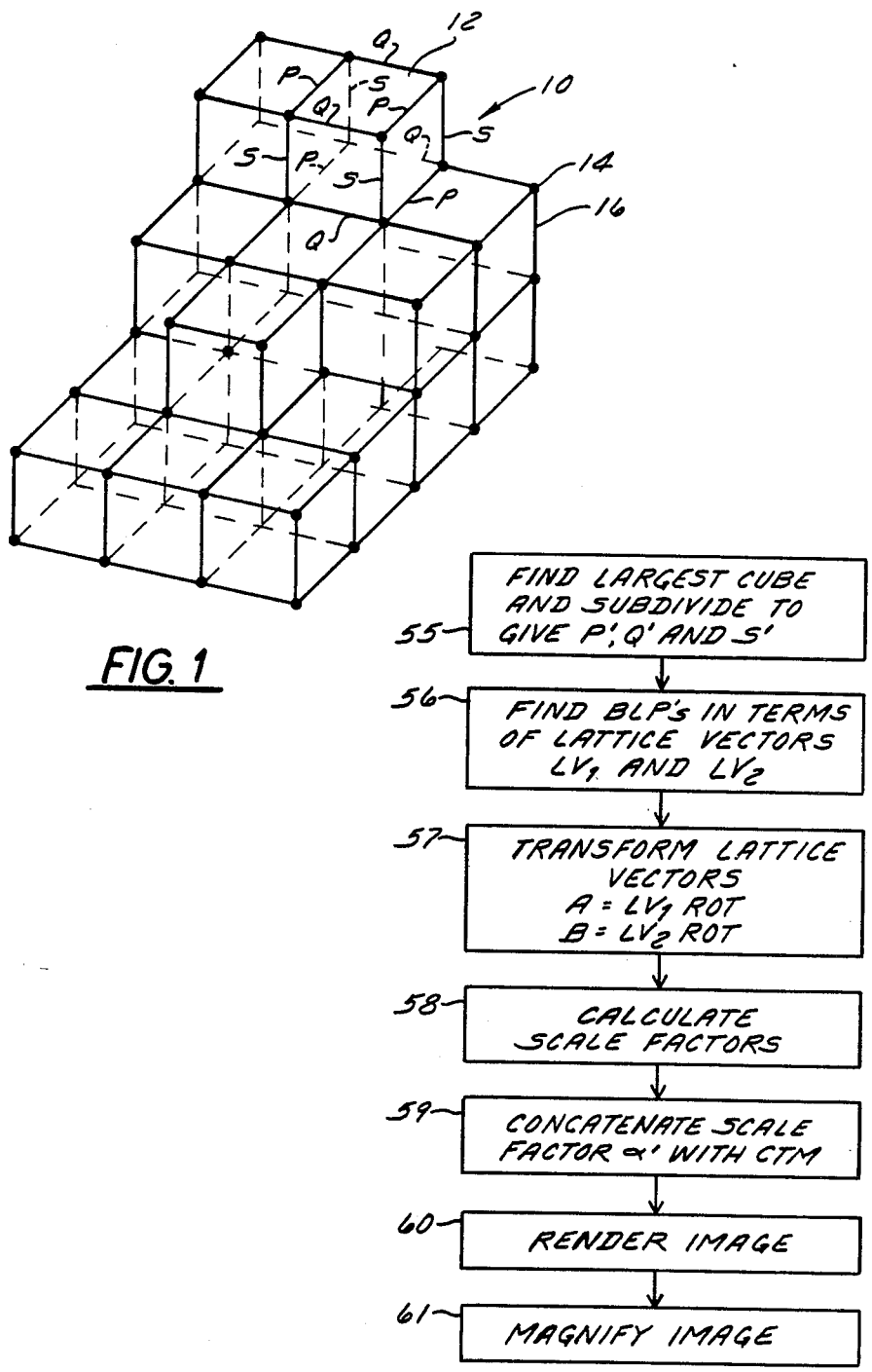
FIG. 1 represents an array of tomographic data from which a surface is to be extracted.
FIG. 10 is a flow chart according to one embodiment of the invention.

Referring to FIG. 1, there is shown, generally at 10, a part of a tomographic array incuding an array of cubes 12 defined by nodes 14 connected by edges 16. Each node 14 represents a signal amplitude of a voxel of tomographic data and each edge 16 represents the distance from one voxel to its neighbor. Although the volumes described are referred to as cubes, edges 16 are not necessarily all of equal length and are probably not since slice thickness is usually not equal to pixel resolution within the slice. Pixel spacings P and Q and slice spacing S are shown for cube 12.

Figure 2:
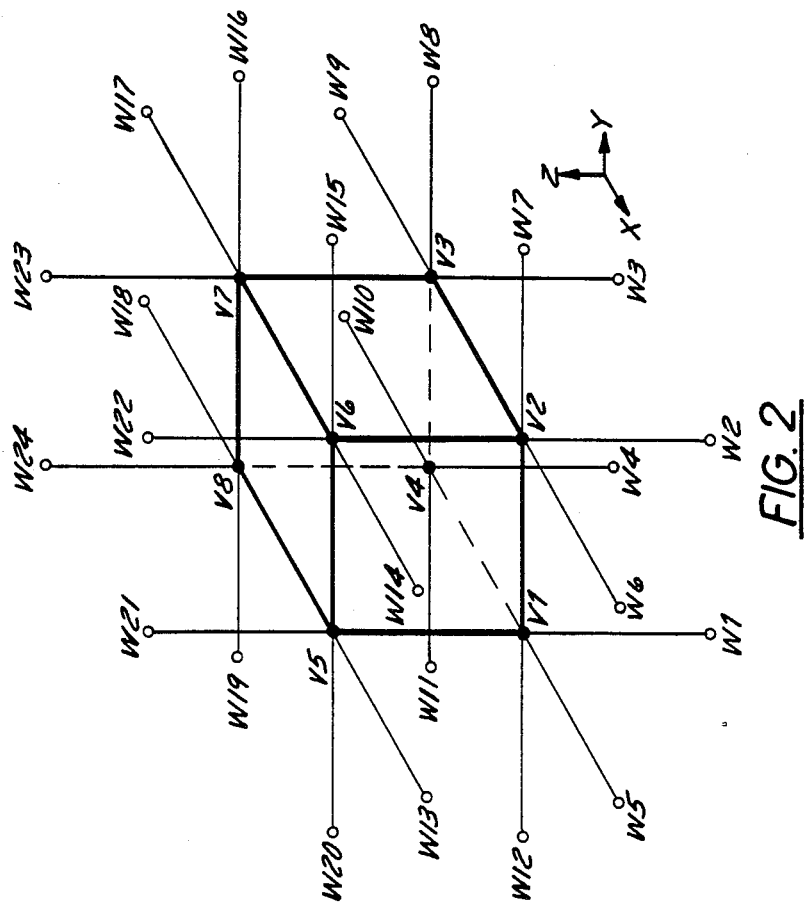
FIG. 2 is a perspective view showing a large cube and its adjacent data points.

In the practice of the invention, each large cube is subdivided by integer factors (greater than or equal to zero) into a number of subcubes. The vertices of the subcubes are compared to a threshold to identify subcubes through which the surface passes. For such identified subcubes, the subcube location and normalized gradient for the subcube center are concatenated resulting in a directed point. The process of subdivision uses a large cube and adjacent points as shown in FIG. 2. Cubically adjacent voxels from the tomographic data are selected to represent the vertices V1–V8 of the large cube. Points W1–W24 are adjacent to V1–V8 and are used in conjunction with V1–V8 to calculate the gradients at the vertices of the large cube. Interpolation can then be performed on the cube and the gradients.

Figure 3:
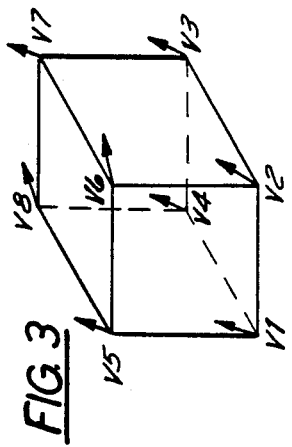
FIG. 3 shows the gradient normals associated with each cube vertex.
Figure 4:
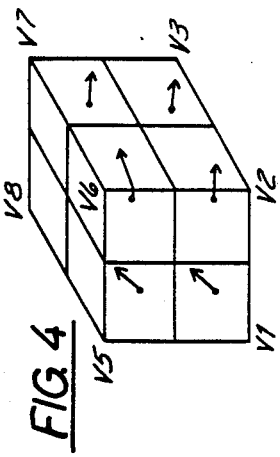
FIG. 4 shows subcubes and their gradient normals.
Figure 5:
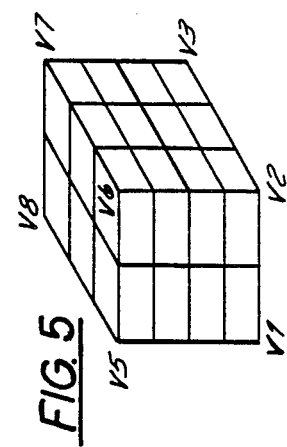
FIG. 5 shows subdivision using a different amount of interpolation than FIG. 4.

FIG. 3 shows examples of gradients associated with the vertices of a cube. FIG. 4 reresents interpolated points and gradient normals which define the subcubes within the large cube. FIG. 5 shows subcubes having different interpolation factors along different axes.

Figure 6A:
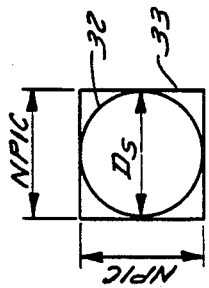
FIGS. 6A and 6B show a method for determining 3-D pixel size.
Figure 6B:
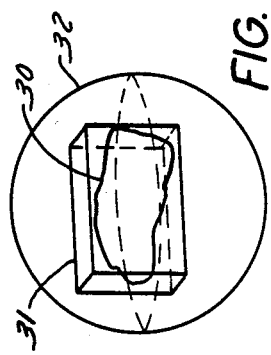

A significant aspect of the invention involves the determination of effective interpolation factors according to a method which will be described with reference to FIG. 6. An object or region of interest 30 contained in a 3-D data base of contiguous slices is to be displayed (FIG. 6A). Its size is approximately by user input during display of several slices and a bounding box 31 is found which encloses the estimated object. Bounding box 31 is the smallest parallelopiped that contains object 30. A sphere 32 is then found which is the smallest sphere containing bounding box 31.

The diameter $D_s$ of sphere 32 is projected onto a virtual display 33 (FIG. 6B) in order to approximate the 3-D pixel size corresponding to object 30. Thus, $D_s$ is calculated as a distance measurement, preferably in the same units as pixel spacings P and Q and slice spacing S (e.g., millimeters). Diameter $D_s$ is then divided by the number of pixels, NPIC, corresponding to the display size. The typical display has an equal number of pixel rows and columns (e.g., 512×512 or 1024×1024), or a size of NPIC by NPIC. If the display is not square, then the smaller number is chosen for NPIC.

The proportions of a subcube depend on the data spacing along each spatial dimension and the interpolation factor used for the respective dimension. With P, Q and S being the data spacings (as in FIG. 1) and defining respective interpolation factors as A, B and C, we then have the size of subcube faces equalling P/A, Q/B and S/C. Relating subcube size to 3-D pixel size, we have $$\frac{P}{A} \leq \beta \frac{D_s}{NPIC},$$

$$\frac{Q}{B} \leq \beta \frac{D_s}{NPIC}, \text{ and}$$

$$\frac{S}{C} \leq \beta \frac{D_s}{NPIC},$$

where A, B and C are the smallest integers satisfying the relationships and where $\beta$ is a constant multiplier for varying the amount of interpolation, as desired. If any one of the data spacings P, Q or S is not constant throughout the data base, then its largest value is used to ensure that the biggest large cube is properly subdivided.

According to the present invention, it has been found that by matching the subcube faces to $1/\sqrt{2}$ of the 3-D pixel size (i.e., $\beta = 1/\sqrt{2}$), it is possible to display maximum-resolution, artifact-free images from any viewing location or angle relative to the object in the tomographic database. For lesser degrees of interpolation (i.e., subcube faces are greater than $1/\sqrt{2}$ of the 3-D pixel size), there will be varying amounts of artifacts depending on the viewing location or viewing angle. For subcube faces greater than $1/\sqrt{2}$ of 3-D pixel size up to and including subcube faces equal to 3-D pixel size (i.e., $1/\sqrt{2} \leq \beta \leq 1$), there will be some viewing angles that will be artifact free (primarily those perpendicular to a major plane of the tomographic data), and there will be viewing angles that result in artifacts (primarily those rotated by 45 degrees from perpendicular to a major plane).

Figure 7:
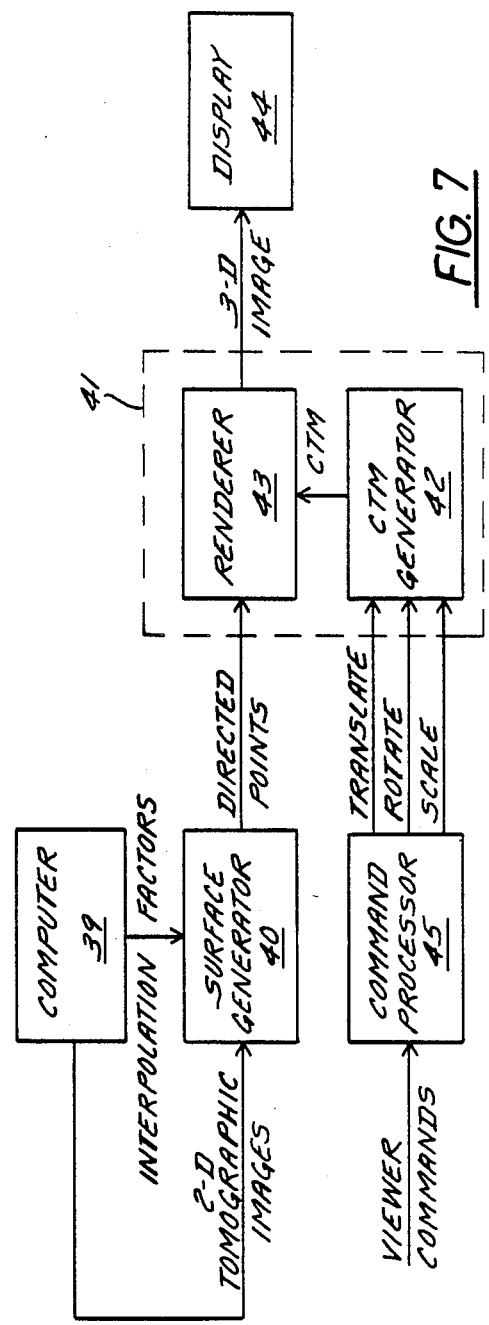
FIG. 7 is a block diagram of processing hardware in one embodiment of the invention.

A first embodiment for a processing hardware implementation of the invention is shown in FIG. 7. Two-dimensional tomographic slices are provided to a surface generator 40. Also input to surface generator 40 are the interpolation factors determined from 3-D pixel size according to the method described above by other processing equipment, such as a general-purpose computer 39. Surface generator 40 implements the dividing cubes method to generate a number of directed points defining the surface that are fed to a display processor 41 which includes a Current-Transformation-Matrix (CTM) generator 42 and a renderer 43.

CTM generator 42 receives a viewer's commands via a command processor 45 for scaling, moving and rotating the object and forms the CTM which is provided to renderer 43 to operate on the directed points. Renderer 43 synthesizes the 3-D image (including projecting directed points onto 3-D pixels and determining shading of illuminated pixels) which is rasterized and sent to display 44 which could be a cathode-ray tube (CRT), for example.

Interpolation factors corresponding to $\beta$ equal to $1/\sqrt{2}$ approximately doubles the number of directed points (and, consequently, processing time and/or capacity) as compared to interpolation factors corresponding to $\beta$ equal to one. A further embodiment of the invention removes image artifacts that would otherwise appear when using lesser amounts of interpolation. This is achieved by reducing the size of objects viewed from angles expected to otherwise produce artifacts. After rendering, the 3-D image can be magnified back to the viewer-commanded size before presentation on the display.

Figure 8:
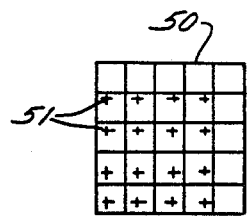
FIG. 8 shows directed points mapped onto a pixel array in the image space.
Figure 9:
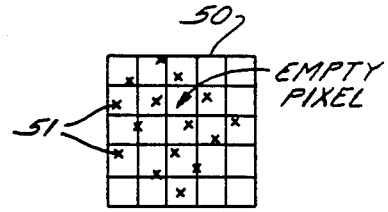
FIG. 9 shows the directed points of FIG. 8 after a rotation about the z-axis.

As discussed above, image artifacts resulting from insufficient interpolation tend to appear at certain abnormal viewing angles or rotational positions. For example, FIG. 8 shows a display pixel array 50 comprising a plurality of pixels, each represented by a box, which are selectively intensified to display an image. A plurality of directed points 51 are shown as crosses mapped onto the pixel display as part of a solid square in a 3-D image. FIG. 9 shows the same surface rotated about the z-axis (i.e., viewing axis) to a point where an empty hole artifact results in the image when directed points 51 are mapped onto array 50.

Artifacts are avoided in the invention by analyzing the rotation and scaling matrices commanded by the viewer in order to determine the degree of abnormality of the viewing position. The viewer commanded scale factor is denoted by $\alpha$ and rotation by ROT. From the degree of abnormality, a scaling factor $\alpha'$ (typically between 1 and $1/\sqrt{2}$) is found that will remove the artifacts by shrinking the image when concatenated with scale factor $\alpha$.

A preferred method for obtaining the scale factor $\alpha'$ involves projecting a subcube onto a virtual 3-D image space. This is done by defining representative basic lattice polygons (BLPs) for each of the xy-, yz-, and zx-planes containing the subcube faces. If there are other sets of planar voxels in the tomographic data, then basic lattice polygons can also be formed in those planes to avoid artifacts coming from those planes. However, in medical imaging of internal structure, there are usually few planar structures within the tomographic data other than those related to pixel and slice spacings (i.e., xy-, yz- and zx-planes), and examination of these three planes is sufficient.

The basic lattice polygons are represented in each respective plane by projected lattice vectors. These vectors are used to determine the needed scale factor for each plane. Of the three (or more) scale factors, the one corresponding to the greatest amount of object shrinkage gives the value of $\alpha'$.

The method is summarized in general terms with reference to FIG. 10. First, the largest subdivided cube in the tomographic data is found in step 55. Usually the slices are evenly spaced so that all cubes are the same size. The cube is subdivided to give largest subcube pixel spacings P' and Q' and slice spacing S'.

In step 56, lattice vectors $LV_1$ and $LV_2$ in each of the xy-, yz-, and xz-planes, respectively, of the tomographic data are given by:

xy-plane:
    $LV_1 = (P',0,0)$
    $LV_2 = (0,Q',0)$
yz-plane:
    $LV_1 = (0,Q',0)$
    $LV_2 = (0,0,S')$
xz-plane:
    $LV_1 = (P',0,0)$ $LV_2 = (O, O, S')$.

In step 57, the lattice vectors are transformed (i.e., projected into the 3-D image space) by transformation matrix CTM to give $A = LV_1 \times ROT\alpha$ and $B = LV_2 \times ROT\alpha$ in the display space. Furthermore, transformed lattice vectors A and B are projected onto the image space xy-plane (i.e., not the original xy-plane in the tomographic object space) as follows:

$$A_{xy} = (A_x, A_y) A_{yz} = (A_x, A_y) A_{xz} = (A_x, A_y)$$

$$B_{xy} = (B_x, B_y) B_{yz} = (B_x, B_y) B_{xz} = (B_x, B_y),$$

where $A_x$, $A_y$, $B_x$ and $B_y$ are in the 3-D image space (i.e., display screen axes).

Scale factors are determined from each transformed lattice vector in step 58. The smallest scale factor $\alpha'$ (i.e., the most shrinkage) is selected in step 59 and concatenated with scale factor $\alpha$. Finally, the image is rendered in step 60 and magnified in step 61.

Figure 11:
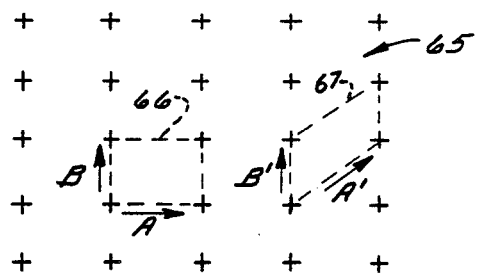
FIG. 11 shows a lattice of points and the basic lattice polygons.
Figure 12:
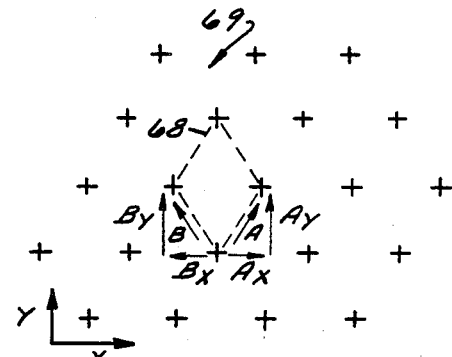
FIG. 12 shows the components of a basic lattice polygon.

The steps of defining the transformed lattice vectors and then determining scale factors (steps 57 and 58 in FIG. 10) need to be described in further detail. The lattice vectors $LV_1$ and $LV_2$ define a lattice of points corresponding to the subcube size in the original tomographic data space. Following transformation, the three pairs of lattice vectors A and B define new lattices of points as rotated by the ROT portion of the CTM. FIG. 11 shows a lattice of points 65 after rotation, each lattice point being represented by a cross. Two different basic lattice polygons 66 and 67 are shown, of which both are equally valid and both can generate the lattice of points. However, for the preferred embodiment of the invention, the polygon with the two smallest lattice vectors is required. Thus, polygon 66 is used in practicing the present method since $A < A'$. FIG. 12 shows a basic lattice polygon 68 for a set of lattice points 69. In this case, lattice vectors A and B have non-zero components $A_x$, $A_y$, and $B_x$ and $B_y$, respectively.

Figure 13:
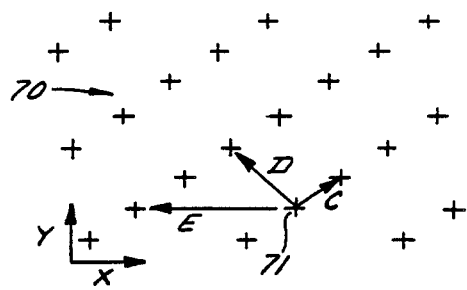
FIG. 13 illustrates the smallest transformed lattice vectors.

The generalized steps for finding the two smallest lattice vectors will be described with reference to FIG. 13. A lattice of points 70 is generated by selecting an origin 71 and placing further points $L_{ij}$ at the vector sums (not shown) $L_{ij} = iA + jB$, where i and j assume integer values over a selected range. In the preferred embodiment, a range of $-5$ to $+5$ is sufficient for both i and j. The lattice is then searched for the smallest vector magnitude $|L_{ij}|$ extending from the origin (i.e., all values of i and j are searched except $i = j = 0$). In FIG. 13, the smallest vector is shown as vector C (the vector equal to $-C$ has the same magnitude and would also work).

The remaining vector D to be found points from the origin to a line of lattice points which is parallel to vector C. By finding the closest parallel line to C and by finding the single point in the parallel line which is closest to the origin, the remaining vector D is derived.

The closest parallel line can be found by determining the angle $\psi$ that vector C (with components $C_x$ and $C_y$) makes with the x-axis using the equation $\psi = \tan^{-1}(C_y/C_x)$. Then for each value of $L_{ij}$, determine the point's perpendicular distance from the line containing vector C by forming the dot product of $L_{ij}$ and $(-\sin\psi, \cos\psi)$. The minimum value of the absolute value of the dot product (but not equal to zero) gives a point on the closest parallel line. Let $i_e$ and $j_e$ be the values of i and j for that point and let $L_{i_e j_e}$ be the vector E. The remaining smallest vector D is found by minimizing $D = |E + iC|$ over the range of i. The values of vectors D and C are now substituted for the values of lattice vectors $A = (A_x, A_y)$ and $B = (B_x, B_y)$, respectively. In most cases, these values will be identical since the transformed lattice vectors (e.g., LV, ROT) will usually be the smallest vectors.

Figure 14:
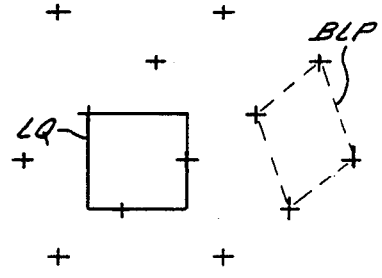
FIG. 14 shows the largest square within a lattice.

Using the lattice vectors A and B from above derived for each of the three tomographic data planes, the scale factor corresponding to each plane can now be found. Within the lattice of points $L_{ij}$, the largest square LQ is grown that can be placed into the lattice without any lattice points inside it as shown in FIG. 14. The scale factor is then given by the inverse of the length of a side of the LQ times the 3-D pixel size as follows:

$$\text{Scale Factor} = (1/LQ)(D_s/NPIC). \quad (1)$$

The minimum scale factor for the three data planes gives $\alpha'$.

Figure 15:
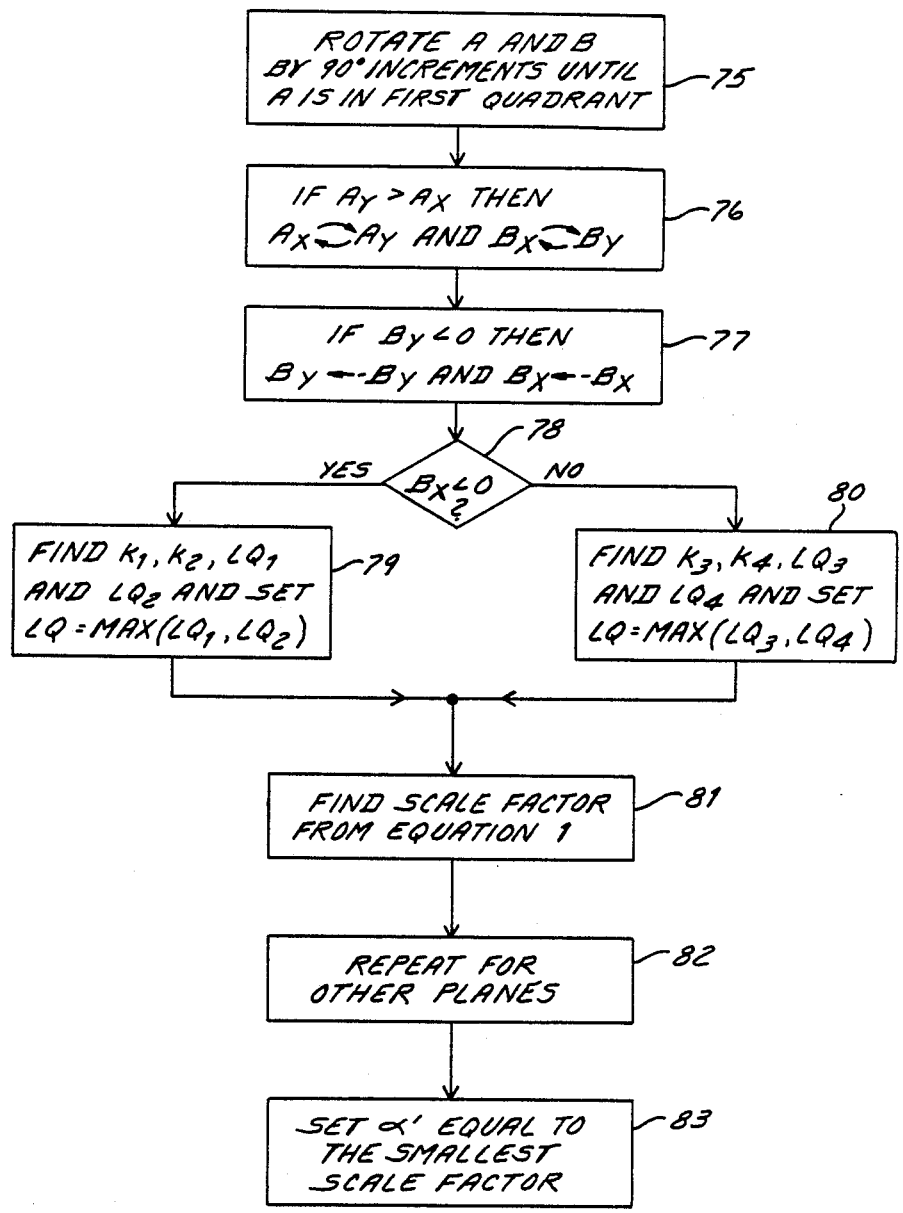
FIG. 15 is a flow chart showing the method of the invention in greater detail.

The preferred steps for determining LQ will be described with reference to FIG. 15. First, vector A must be rotated into the first quadrant in the xy-image space by using from zero to three 90° rotations in step 75. Vector B receives the same number of 90° rotations.

In step 76, if $A_y > A_x$, then the values of $A_x$ and $A_y$ are switched and the values of $B_x$ and $B_y$ are switched. In step 77, if $B_y < 0$, then $B_y$ is set to $-B_y$ and $B_x$ is set to $-B_x$.

A family of rectangles are generated from the values of A and B resulting after step 77 in order to determine the largest square. Assuming that $B_x < 0$, the lengths for the horizontal and vertical sides, $\Delta X_k$ and $\Delta Y_k$, respectively, for one family of rectangles are given by $$\Delta X_k = A_x + (k-1)B_x \quad (2)$$

and $$\Delta Y_k = A_y + (k+1)B_y \quad (3)$$

where $k = 1, 2, 3 \ldots$. The largest square occurs when $\Delta X_k = \Delta Y_k$ and solving for k for this family gives $$k_1 = (A_x - A_y - B_x - B_y)/(B_y - B_x). \quad (4)$$

It is possible that $k_1$ is not an integer, so we define an integer m as the largest integer less than or equal to $k_1$ (i.e., $m = INT(k_1)$). Furthermore, the largest square for this family $LQ_1$ is given by inserting the value of m and $m+1$ into Equations (2) and (3) as follows:

$$LQ_1 = MAX[MIN(\Delta X_m, \Delta Y_m), MIN(\Delta X_{m+1}, \Delta Y_{m+1})].$$

Another family of rectangles that can be generated when $B_x < 0$ has horizontal and vertical sides given by $$\Delta X_k = (1-k)A_x - B_x \quad (6)$$

and $$\Delta Y_k = (1+k)A_y + B_y. \quad (7)$$

Solving for k gives $$k_2 = (A_x - B_x - B_y - A_y)/(A_y + A_x). \quad (8)$$

The largest square $LQ_2$ for this family is given by $$LQ_2 = MAX[MIN(\Delta X_n, \Delta Y_n), MIN(\Delta X_{n+1}, \Delta Y_{n+1})] \quad (9)$$

where n=INT(k$_2$). By combining the two families of rectangles we find the largest square LQ to be the maximum of LQ$_1$ and LQ$_2$. Thus, if B$_x$<0, then this value of LQ is substituted in Equation (1) to give the scale factor for the plane under consideration.

In the case that B$_x$≧0, there are two alternate families of rectangles. The first is given by $$\Delta X_k = A_x + (1-k)B_x \quad (10)$$

and $$\Delta Y_k = -A_y + (k+1)B_y. \quad (11)$$

Solving for k gives $$k_3 = (A_x + A_y + B_x - B_y)/(B_x + B_y). \quad (12)$$

The largest square LQ$_3$ found by inserting the values of g=INT(k$_3$) and g+1 into Equations (10) and (11) gives $$LQ_3 = MAX[MIN(\Delta X_g, \Delta Y_g), MIN(\Delta X_{g+1}, \Delta Y_{g+1})]. \quad (13)$$

The other family of rectangles is given by $$\Delta X_k = (k-1)A_x - B_x \quad (14)$$

and $$\Delta Y_k = (1-k)A_y + B_y. \quad (15)$$

Solving for k gives $$k_4 = (A_x + A_y + B_x + B_y)/(A_x + A_y) \quad (16)$$

and the largest square LQ$_4$ is $$LQ_4 = MAX[MIN(\Delta X_h, \Delta Y_h), MIN(\Delta X_{h+1}, \Delta Y_{h+1})] \quad (17)$$

where h=INT(k$_4$). For the case of B$_x$≧0, the largest square LQ=MAX(LQ$_3$, LQ$_4$).

Returning to FIG. 15, a decision is made in step 78 whether B$_x$ is less than zero. If the answer is yes, then step 79 is done. In step 79, k$_1$, k$_2$, LQ$_1$, and LQ$_2$ are found from Equations (2)-(9) and LQ is set to the maximum if LQ$_1$ and LQ$_2$. If the answer in step 78 is no, then in step 80 we determine k$_3$, k$_4$, LQ$_3$ and LQ$_4$ and set LQ to the maximum of LQ$_3$ and LQ$_4$. In step 81, the scale factor for the plane under consideration is found from plugging the value for LQ into Equation (1).

In step 82, the procedure in steps 75 to 81 are repeated for the other data planes. Scale factor α′ is determined in step 83 by taking the smallest previously calculated scale factor.

This scale factor α′ is concatenated with the current scale factor α and sent to the CTM generator. Thus, the displayed image will be artifact free.

Figure 16:
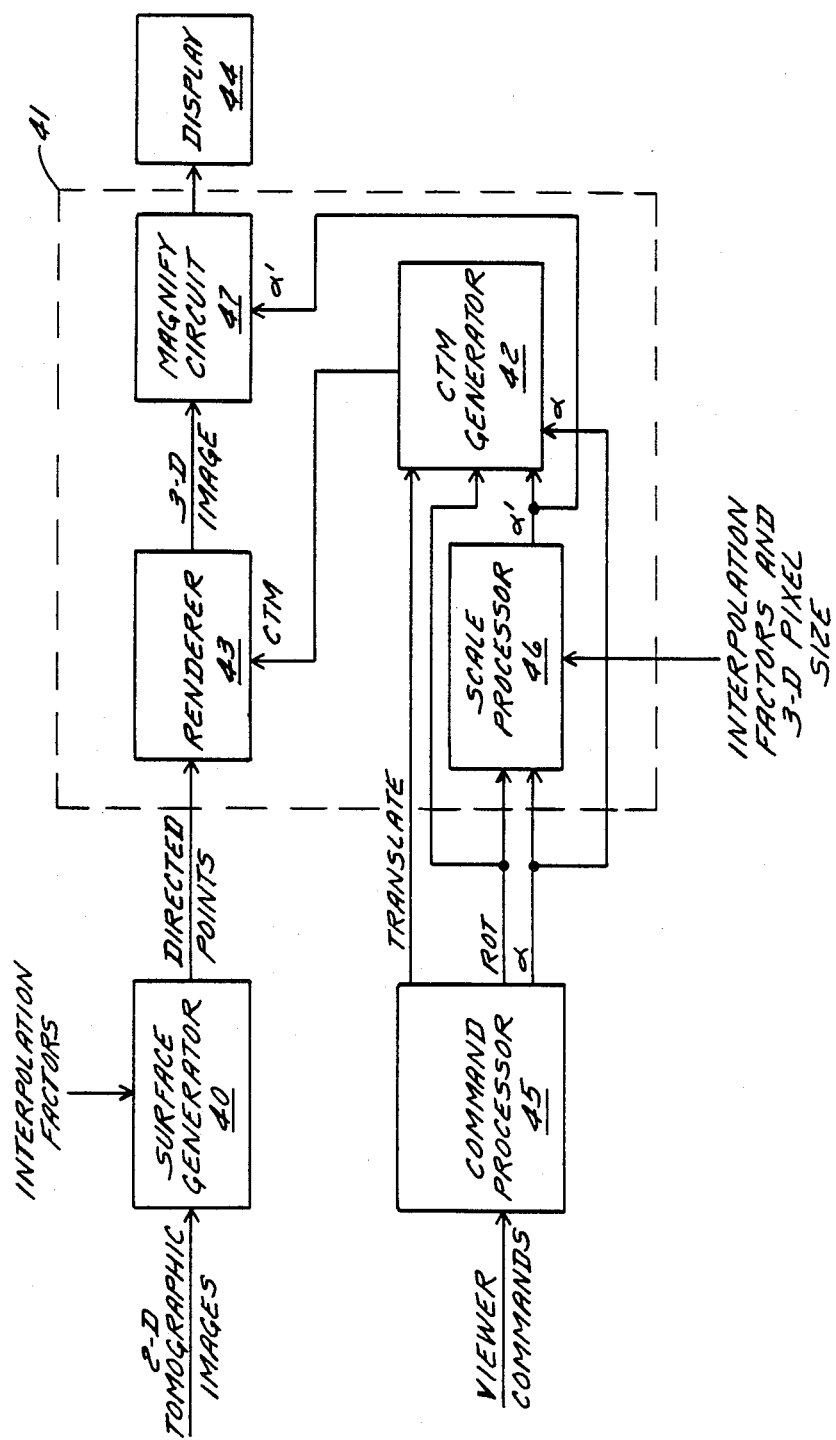
FIG. 16 is a block diagram of a hardware embodiment for shrinking images to remove artifacts.

A further hardware implementation is shown in FIG. 16. Additional components in display processor 41 include a scale processor 46 and a magnify circuit 47. Scale processor 46 receives the ROT and α values from command processor 45 and interpolation factors and 3-D pixel size from external hardware. The calculated value of α′ is output to CTM generator 42 which concatenates α′ with α and then provides the CTM to renderer 43. Magnify circuit 47 receives the scale factor α′ from scale processor 46 and the 3-D image from renderer 43. Magnify circuit 47 magnifies the 3-D image by the inverse of the scale factor α′ and provides the new image to display 44.

The foregoing invention has provided artifact-free images in dividing cubes images. This can also be done while minimizing data handling and computations without sacrificing image quality at normal viewing positions. Automatic scaling of the object according to the current transformation matrix corrects for under-interpolation of the data, if any.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. Graphical display apparatus comprising:
    data means for providing data representing a plurality of cross-sectional slices of an object;
    surface generator means coupled to said data means for receiving said slice data, for generating subcubes having dimensions proportioned to corresponding slice data by means of interpolation factors respectively corresponding to the dimensions, and for extracting a surface definition from said slice data as a plurality of directed points;
    calculating means coupled to said surface generator means for calculating the 3-D pixel size of an object to be displayed and for calculating said interpolation factors, wherein said interpolation factors are used to generate subcube faces corresponding to a respective multiplier of said 3-D pixel size, said multiplier being in the range of about 1/√2 and higher; and
    display processing means coupled to said surface generator means for rendering a 3-D image from said directed points.

2. The apparatus of claim 1 wherein said calculating means includes boundary input means for specifying the boundaries of an area of interest in separate cross-sectional slices.

3. The apparatus of claim 1 wherein said multiple is greater than 1/√2, and wherein said display processing means comprises:
    scaling means receiving a scaling command, a rotation command, said subcube size, and said 3-D pixel size for generating a scaling factor to eliminate artifacts in said 3-D image resulting from insufficient interpolation.

4. The apparatus of claim 3 wherein said display processing means further comprises magnification means coupled to said scaling means for magnifying the rendered 3-D image according to the inverse of said scaling factor.

5. The apparatus of claim 3 wherein said multiplier is substantially equal to one.

6. A method for generating a three-dimensional image of an object from a plurality of slices of tomographic data, said method comprising the steps of:
    defining boundaries of said object within said data;
    matching said boundaries to a predetermined pixel array to define a 3-D pixel size;
    interpolating said data according to interpolation factors that give subdivided data spacings which are related to said 3-D pixel size by a multiplier in the range of about $1/\sqrt{2}$ and higher; and extracting a surface definition of said object from said interpolated data.

7. The method of claim 6 further comprising the steps of:

defining a viewing perspective for said 3-D image;

scaling said surface definition by a reduction factor determined according to said viewing perspective and said subdivided data spacings; and rendering said scaled surface definition into a rasterized image.

8. The method of claim 7 further comprising the steps of:

magnifying said rasterized image by the inverse of said reduction factor; and displaying said magnified image on a display monitor.

9. The method of claim 7 wherein said multiplier is substantially equal to one and wherein said reduction factor is in the range of about $1/\sqrt{2}$ to about 1.

10. The method of claim 7 wherein said reduction factor is determined by a method comprising the steps of:

defining lattice vectors within tomographic data planes of said slices;

transforming said lattice vectors according to said viewing perspective;

calculating a scale factor corresponding to each of said data planes from said transformed lattice vectors; and finding the minimum of said scale factors, said reduction factor being proportional to said minimum scale factor.

* * * * *

UNITED STATES PATENT AND TRADEMARK OFFICE
CERTIFICATE OF CORRECTION

PATENT NO. : 4,885,688

DATED : Dec. 5, 1989

INVENTOR(S) : Carl R. Crawford

It is certified that error appears in the above-identified patent and that said Letters Patent is hereby corrected as shown below:

Column 2, line 8, change "illustion" to --illusion--.

Column 4, line 56, change "approximately" to --approximated--.

Column 10, line 45, change "multiple" to --multiplier--.

Signed and Sealed this

Twenty-fifth Day of June, 1991

Attest:

Attesting Officer

HARRY F. MANBECK, JR.

Commissioner of Patents and Trademarks